(12) United States Patent
Swope et al.

(10) Patent No.: US 11,832,586 B2
(45) Date of Patent: Dec. 5, 2023

(54) ANIMAL IDENTIFICATION SYSTEM AND RELATED METHODS

(71) Applicant: RapID Lab, Inc., San Francisco, CA (US)

(72) Inventors: Mark Swope, San Francisco, CA (US); Bretton Mark Swope, San Francisco, CA (US); Vanessa Lai, San Francisco, CA (US)

(73) Assignee: RapID Lab, Inc., San Francisco, CA (US)

( * ) Notice: Subject to any disclaimer, the term of this patent is extended or adjusted under 35 U.S.C. 154(b) by 0 days.

(21) Appl. No.: 17/884,504

(22) Filed: Aug. 9, 2022

(65) Prior Publication Data

US 2023/0043621 A1 Feb. 9, 2023

Related U.S. Application Data

(63) Continuation-in-part of application No. 17/300,310, filed on Aug. 9, 2021.

(51) Int. Cl.
*A01K 11/00* (2006.01)

(52) U.S. Cl.
CPC .......... *A01K 11/002* (2013.01); *A01K 11/004* (2013.01)

(58) Field of Classification Search
CPC .. A61K 11/001; A61K 11/002; A61K 11/003; A61K 11/004; A61B 90/90; A61B 90/92; A61B 90/94; A61B 90/96; A61B 90/98; G06K 19/07
See application file for complete search history.

(56) References Cited

U.S. PATENT DOCUMENTS

| | | | |
|---|---|---|---|
| 3,952,439 A * | 4/1976 | Armand | A01K 11/001 D30/155 |
| 5,768,813 A * | 6/1998 | Reboul | B29C 45/1671 343/788 |
| 10,588,385 B1 * | 3/2020 | Borgese | A44C 3/001 |
| 2011/0088295 A1 * | 4/2011 | Ibsen | A01K 11/002 235/494 |
| 2019/0357496 A1 * | 11/2019 | Auer | A01K 11/001 |

* cited by examiner

*Primary Examiner* — Sarah A Long
(74) *Attorney, Agent, or Firm* — Run8 Patent Group, LLC; Peter Miller

(57) ABSTRACT

One variation of a system includes a tag including a panel defining an inner face; an outer face opposite the inner face and comprising a digital optical identifier; and a set of perforations interposed between the digital optical identifier and a perimeter of the panel; a tag housing molded around the perimeter of the panel and through the set of perforations in the panel; defining a body supporting the inner face of the panel; defining a rim extending from the body, encasing an edge of the panel; extending through the set of perforations in the panel; and extending over the set of perforations in the panel; and a barb extending from the body opposite the rim; a backing plate configured to receive the barb of the tag housing; and an applicator configured to drive the barb through an ear of an animal and into the backing plate.

13 Claims, 10 Drawing Sheets

ANIMAL IDENTIFICATION SYSTEM AND RELATED METHODS

CROSS-REFERENCE TO RELATED APPLICATIONS

This application is a continuation-in-part application of U.S. patent application Ser. No. 17/300,310 filed on 9 Aug. 2021, and is related to U.S. patent application Ser. No. 14/614,328, filed on 4 Feb. 2015, each of which is incorporated in its entirety by the reference.

TECHNICAL FIELD

This invention relates generally to the field of animal identification and more specifically to a new and useful animal identification system in the field of animal identification.

DESCRIPTION OF THE EMBODIMENTS

Figure 1:
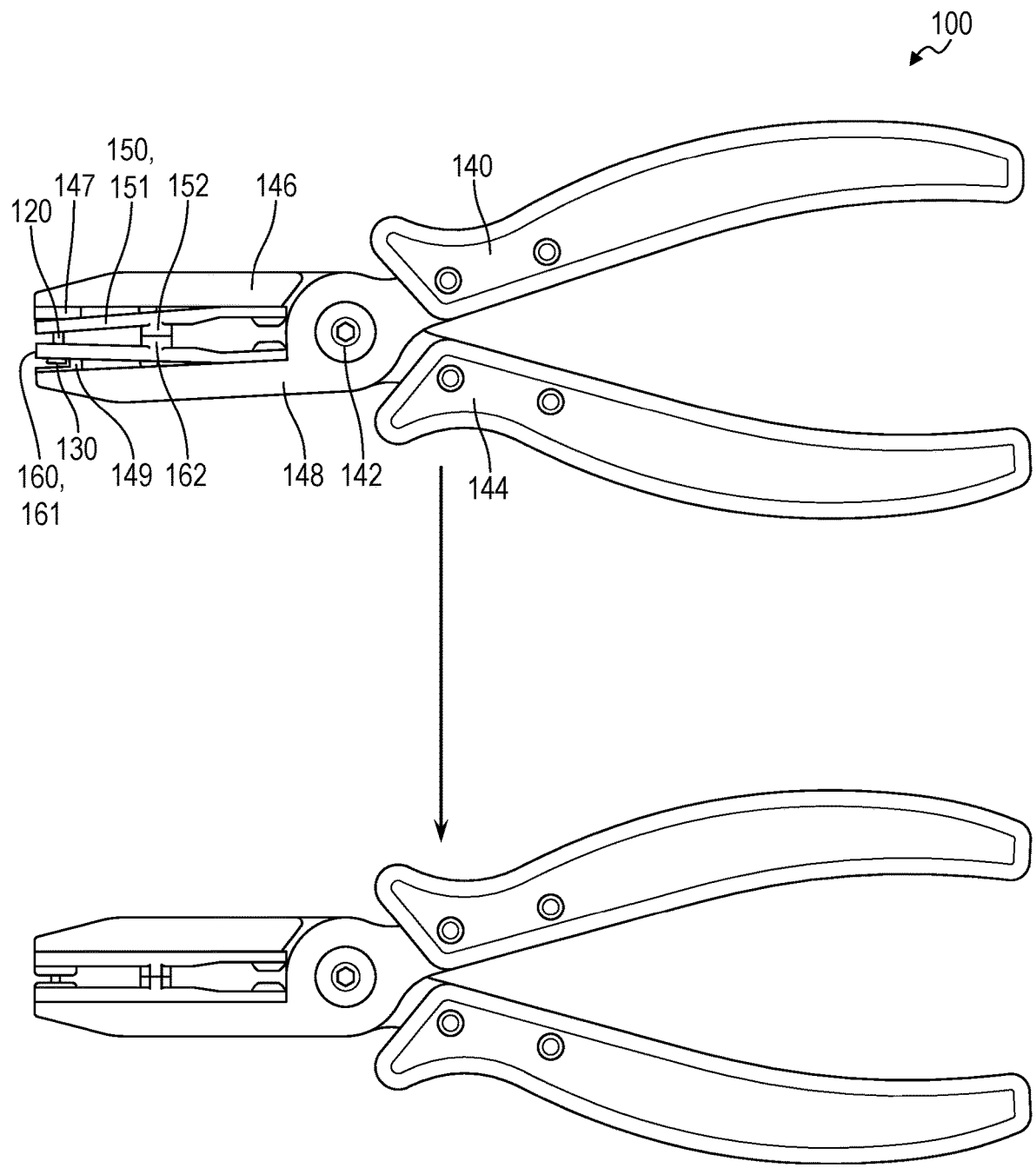
FIG. 1 is a flowchart representation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Systems

As shown in FIGS. 1, 2, 3, 4, 5, 6, 7, 8A, 8B, 9, 10, 11A, 11B, and 12 an animal identification system 100 includes: a tray 110 defining a set of tag receptacles 112; a set of tags 120, each tag 120 defining a tag base 121 and a barb 122 and located in a tag receptacle 112 in the tray 110; a set of backing plates 130, each backing plate 130 defining a receiver and located in the tag receptacle 112 in the tray 110 with the receiver coaxial with the barb 122 of the corresponding tag occupying the tag receptacle 112; and an applicator 140 configured to insert into the tag receptacle 112 in the tray 110, to retrieve the tag 120 and the backing plate 130 from the tag receptacle 112 while maintaining a receiver of the backing plate 130 coaxial with the barb 122 of the tag 120, and to pierce an appendage of an animal and assemble the backing plate 130 onto the barb 122 of the tag 120 in a continuous actuation motion.

As shown in FIGS. 1-5, an animal identification system 100 includes: a first tag 120 including, a panel 102 defining an inner face 103; an outer face 104 opposite the inner face 103 and including a digital optical identifier 133; a set of perforations 105 interposed between the digital optical identifier 133 and a perimeter of the panel 135; a tag housing 134 molded around the perimeter of the panel 135 and through the set of perforations 105 in the panel 102; defining a body 136 supporting the inner face 103 of the panel; defining a rim 137 extending from the body 136; encasing an edge 138 of the panel 102; extending through the set of perforations 105 in the panel; and extending over the set of perforations in the panel; and a barb 122 extending from the body 136 opposite the rim 137. The animal identification system further includes a backing plate 130 configured to receive the barb 122 of the tag housing 134; and an applicator 140 including an upper tongue 150 defining a pair of upper forks 151 configured to receive the tag 120; including a lower tongue 160 defining a pair of lower forks 161 configured to receive the backing plate 130; and configured to drive the barb 122 through an ear of an animal and into the backing plate 130 to identify the animal according to the digital optical identifier 133.

As shown in FIGS. 1-5, a tag system 100 includes: a panel 102 defining an inner face 103; an outer face 104 opposite the inner face 103 and including a digital optical identifier 133; a set of perforations 105 interposed between the digital optical identifier 133 and a perimeter of the panel 135; and a tag housing 134 molded around the perimeter of the panel 135 and through the set of perforations 105 in the panel 120, defining a body 136 supporting the inner face 103 of the panel 102, defining a rim 137 extending from the body 136, encasing an edge 138 of the panel; extending through the set of perforations 105 in the panel, and extending over the set of perforations 105 in the panel; and a barb 122 extending from the body 136 opposite the rim 137.

2. Method

Figure 13A:
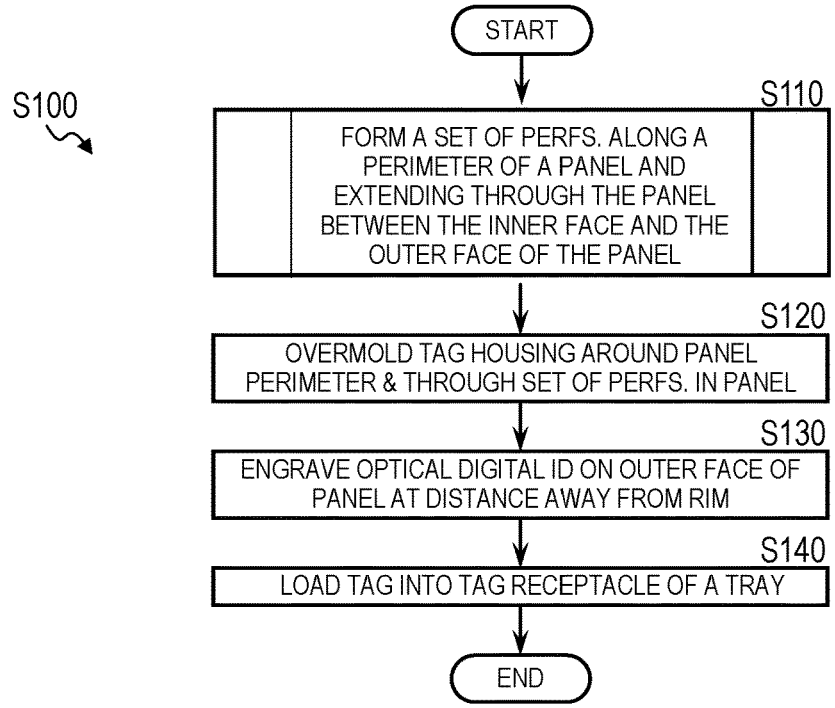
FIGS. 13A, and 13B are flowchart representations of a method.
Figure 13B:
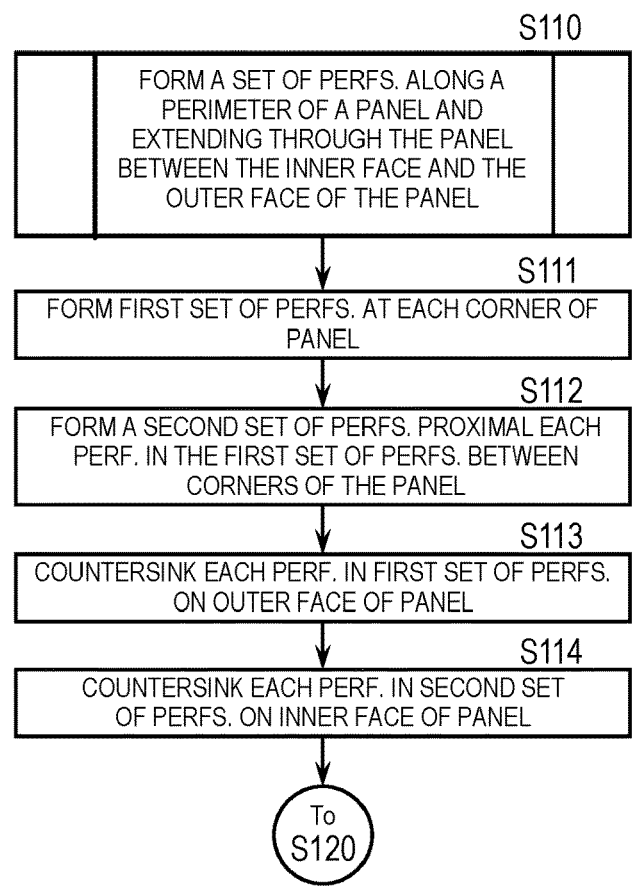

As shown in FIGS. 13A, and 13B, a method S100 for manufacturing a tag 120 includes: forming a set of perforations 105 along a perimeter 135 of a rectilinear panel 102, the set of perforations 105 extending through the rectilinear panel 102 between an inner face 103 and an outer face 104 of the panel in Block S110; overmolding a tag housing 134 around the perimeter 135 of the rectilinear panel 102 and through the set of perforations 105 in the rectilinear panel defining a body 136 supporting the inner face 103 of the rectilinear panel 102, defining a rim 137 traversing an edge 138 of the rectilinear panel 102 and extending through the set of perforations 105 in the rectilinear panel, and defining a barb 122 extending from the body 136 of the tag housing 134; engraving an optical digital identifier 133 on the outer face 104 of the rectilinear panel 102 at a distance away from the rim 137; and loading the tag into a tag receptacle 112 of a tray 110, via an applicator 140, by locating the barb 122 coaxial with a tag receiver 132 of a corresponding backing panel 130.

3. Applications

Generally, the animal identification system 100 can include: a set of tags 120, each containing visual and/or digital identifying information, loaded into a tray 110 with a set of corresponding backing plates 130; and an applicator 140 configured to assemble each tag with a corresponding backing plate onto an appendage (e.g., an ear) of an animal (e.g., a mouse, rat, or other rodent) to identify the animal based on the visual and/or digital identifying information located on the corresponding tag.

In one implementation, the tray 110 can locate a set (e.g., a row) of tags 120 and a set (e.g., row) of corresponding backing plates 130. More specifically, each backing plate 130 defines a tag receiver 132 coaxially aligned with a barb 122 of a corresponding tag 120 within the tray 110. The applicator 140 can include a pair of tongues configured to: insert into a tag receiver 132 in the tray 110; concurrently engage a tag 120 with the corresponding backing plate 130 seated in the tag receptacle 112; extract the tag 120 and backing plate 130 from the tag receptacle 112; to maintain the tag receiver 132 of the backing plate 130 coaxial with the barb 122 of the tag 120 once removed from the tag receptacle 112; drive the barb 122 through the ear of a rodent and into the tag receiver 132 of the backing plate 130; automatically release the tag 120 and backing plate 130; and to stop application of additional force onto the rodent's ear just as the barb 122 fully inserts and locks within the tag receiver 132 of the backing plate 130. The applicator 140 can therefore prevent damage to the rodent's ear while enabling an operator (e.g., a lab technician) to rapidly tag the rodent with a single loading operation (e.g., inserting the applicator 140 into a tag receptacle 112 in the tray 110) followed by a single applicator 140 actuation (e.g., a single "squeeze" motion of the applicator 140 over the rodent's ear).

In one implementation, the animal identification system 100 can include a set of tags, each tag 120 defining a tag base 121 (e.g., 3.5 millimeters by 3.5 millimeters in size) and including an optical identifier element 133—such as a quick response code (hereafter "QR code"), a machine readable image (e.g., an icon, a graphic) etc.—that is sufficiently small for deployment and attachment on small, young rodents, such as mice between five and seven days of age. In this example, each optical identifier element 133 is: configured to differentiate between mice within a cohort, such when genotyping a batch of young mice; and interpretable by monitoring equipment—such as, infrared cameras, QR readers, etc.—to uniquely identify mice within the cohort.

Furthermore, the tongues of the applicator 140 can also define small cross-sections—configured to interface with the set of tags 120 and respective backing plates 130—to enable an operator to place a tag near the base of a rodent's skull such that the tag 120 remains in a comfortable position for the rodent as the rodent grows.

Generally, in one implementation, the tag 120 can include: a panel 102; and a tag housing 134. The panel 102 can include a set of perforations (e.g., bores) positioned along a perimeter of the panel circumscribing the optical identifier element. The tag housing 134 can be (over)molded along the perimeter of the panel and extend through a portion of the set appropriations in the panel; define a body to support; and define a rim encasing an edge of the panel; extending through the set of perforations in the panel; and extending over the set of perforations in the panel. Therefore, the tag housing is configured to secure and stabilize the panel between the rim and the body of the tag housing via the polymer overmolding through the set of perforations along the perimeter of the panel. Thus, the set of perforations can reduce dislocation of the panel in the tag housing and/or reduce separation of the panel from the tag housing responsive to a rodent biting (or chewing off) a portion of the tag housing (or a portion of the rim).

The animal identification system 100 is described herein as a tag, tag organization, and tag application system for identifying small rodents in batch experiments. However, the animal identification system 100 can be implemented by an operator, etc. to tag large rodents or other animals.

4. Tag: Panel

Generally, as shown in FIGS. 7, 8A, 8B, 11A, and 11B, a tag 120 includes: a rectilinear panel 102 (e.g., rectangular, square) defining an inner face 103; an outer face 104 opposite the inner face 103 and including a digital optical identifier 133; and a set of perforations 105 extending through the panel 102 between the inner face 103 and the outer face 104 and interposed between a digital optical identifier 133 and a perimeter 135 of the panel. In this implementation, the set of perforations 105 includes a first set of perforations 106 (e.g., four) positioned at each corner 108 of the panel; and a second set of perforations 107 (e.g., four) arranged proximal each perforation in the first set of perforations 106 between corners 108 of the rectangular panel.

In one implementation, the perforations are countersunk on the outer face of the panel, and the panel is overmolded with polymer to form a tag. Thus, when hot polymer flows through the perforations, the polymer forms a set of heads (e.g., approximating "rivet heads") in the countersunk regions of these perforations and approximately flush with the outer face of the panel. When the polymer cools and shrinks, these polymer heads tighten against the countersunk perforations and thus tighten the panel against the base of the tag. Therefore, if another animal (e.g., a second rat) chews on the rim of the tag and exposes the edge of the tag after the tag is deployed on the ear of a particular animal (e.g., a first rat), the polymer heads may retain the panel—and identifying data contained thereon—against the base of the tag and thus prevent loss of identifying data from the tag.

Furthermore, in this implementation, the panel can define the set of perforations inset from the edge of the panel and outwardly offset from the identifying data (e.g., QR code) applied to the center of the panel. Furthermore, the rim of the tag can extend inwardly from the edge of the base of the tag to intersect a portion (e.g., 30%) of the area prescribed by each perforation in the tag. Thus, when the tag is overmolded around the panel, the rim can extend up to a fuse with the polymer head extending through each perforation in the panel: such that the polymer heads support and strengthen the interior edge of the rim; and such that the rim shields these polymer heads from animals (e.g., chewing or gnawing by animals).

Figure 8A:
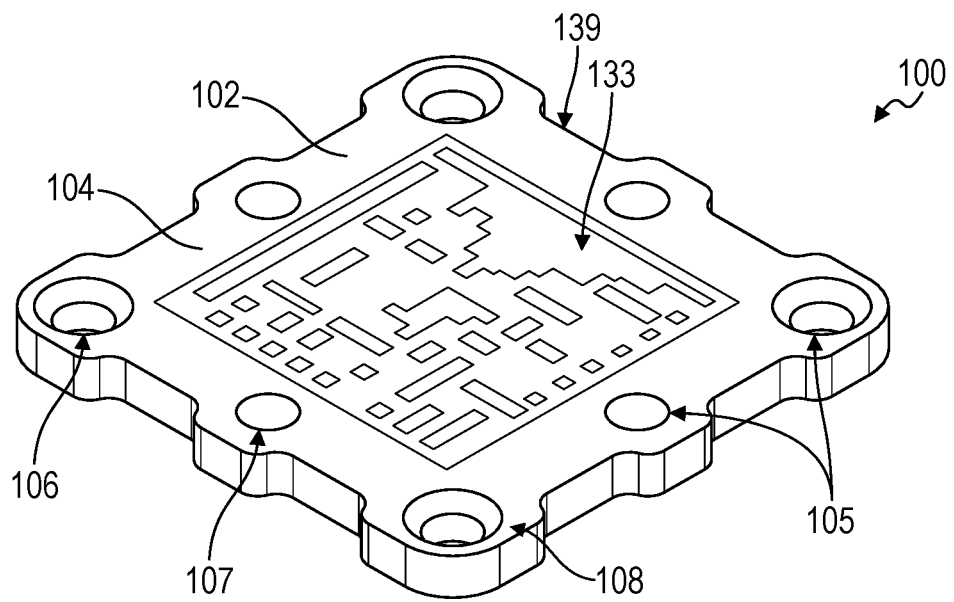
FIGS. 8A and 8B are schematic representations of one variation of the system.
Figure 8B:
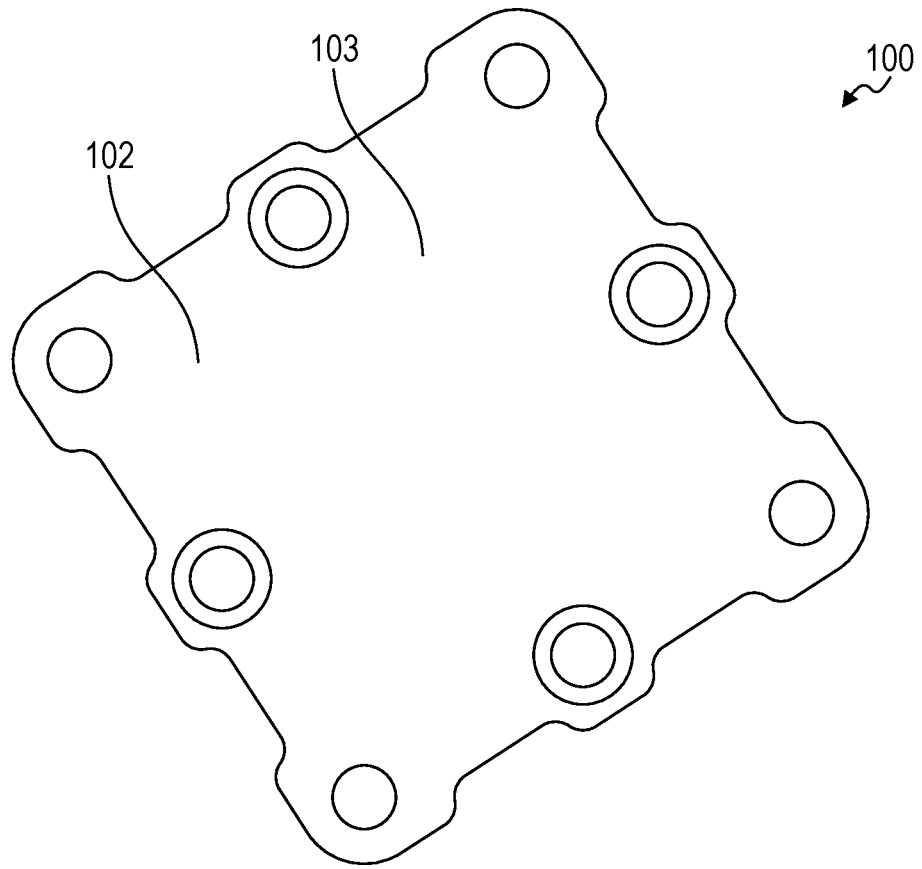
Figure 9:
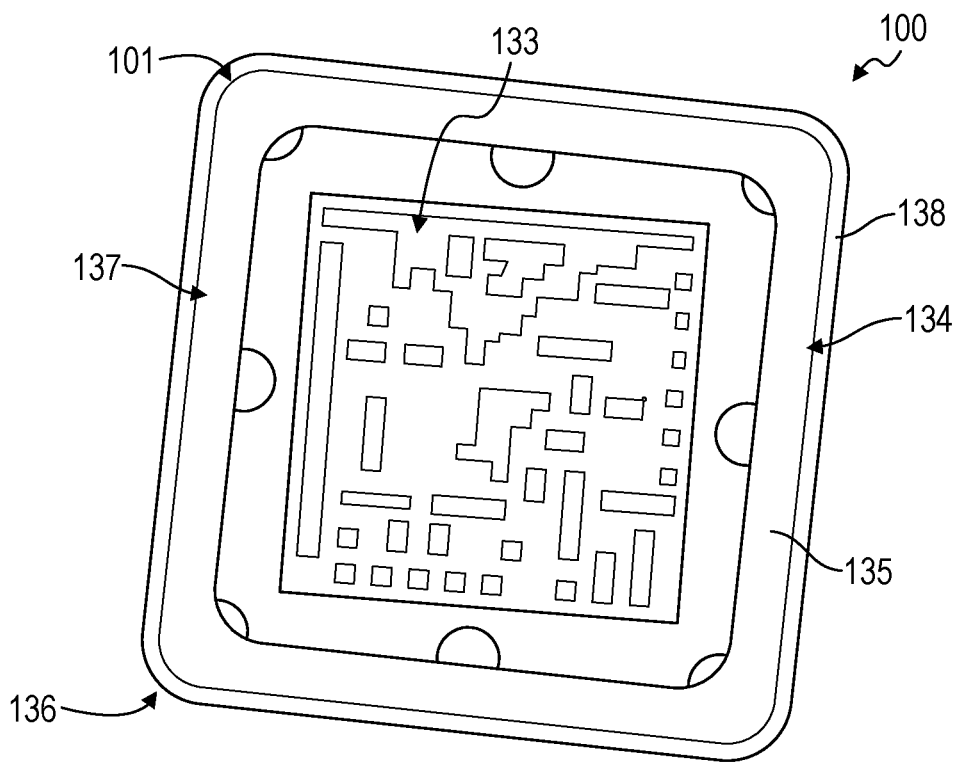
FIG. 9 is a schematic representation of one variation of the system.

In one variation shown in FIGS. 8A, 8B, and 9, the panel includes: a first set of four perforations in each corner of the panel and countersunk on a first face of the panel; and a second set of four perforations along the edges of the panel between the first set of perforations and countersunk on a second face of the panel opposite the first face. Thus, in this variation, the panel is laterally and longitudinally symmetric and includes four equally-spaced countersunk perforations on each face. Therefore, the panel can be loaded into an injection mold in any yaw position and with either the first face or the second face facing outwardly from a mold cavity of the injection mold to form a tag with four polymer heads extending through four countersunk perforations in the panel and with the interior of the rim connected to the base of the tag via polymer extending through these eight perforations, as shown in FIG. 9.

In one implementation, the panel is constructed of an anodized or enameled metallic sheet, such as 0.010" steel or 0.020" aluminum.

In one variation, the panel 102 includes a set of rectilinear reliefs 139 (e.g., cut-outs) positioned along edges 138 of the panel 102. Additionally, or alternatively, the set of rectilinear reliefs 139 can be positioned between each perforation in the set of perforations. The set of rectilinear reliefs 139 are configured to further anchor the panel 102 within the tag housing 134 when the polymer is overmolded around the perimeter of the panel and encases the set of reliefs.

In one variation, the outer face 104 of the panel is textured via an abrasive media (e.g., sanded) prior to application (e.g., engraving, etching) of the optical identifier on the panel 102. For example, the rectilinear panel includes a textured pattern across the outer face 102 of the panel. Therefore, by including the textured pattern in the outer surface of the panel, the textured panel architecture can reduce reflection of light during experimentation, such as occurring in dark or dim environments, thereby aiding in recognition of the optical digital identifier by equipment such as infrared cameras.

5. Tag: Optical Identifier

Generally, each tag 120 includes visual and/or digital identifying information to characterize an animal (mouse, rat, or other rodent) in a batch experiment. In one implementation, the tag 120 includes an identifier element 133 containing a unique visual (e.g., optical) and/or wirelessly transmitted digital identifier; and is (over)molded into the base of the tag 120.

In one implementation, the optical digital identifier includes a machine-readable image—such as, an icon, a graphic, etc. More specifically, the optical digital identifier includes quick response code etched across the outer face 104 of the panel 102. More specifically, the optical digital identifier includes the quick response code etched across the outer face 104 of the panel 102 at a distance away from the set of perforations 105.

In one implementation, the identifier element can include: an anodized aluminum (or enameled steel, etc.) panel etched to depict the QR code (or 2D DATAMATRIX code, etc.); a painted aluminum panel laser-engraved to depict a QR code; and/or a fiberglass or flexible PCB with inductive coil, antenna, and integrated circuit loaded with a unique identifier, which together form an RFID tag. In one variation, the optical digital identifier 133 is etched to the outer face 104 of the panel 102 following polymer (over)molding of the rim and body of the tag housing.

6. Tag: Tag Housing

Generally, a tag 120 includes: a rectilinear tag base 121, such as a square base or square base with fileted or chamfered corners; a barb 122 extending rearward from (the center of) the tag base 121; and the identifier element 133.

In one implementation, the tag 120 includes a tag housing 134 (over)molded around each edge 138 of the panel and through the first set 106 and the second set 107 of perforations in the panel to define a body 136 supporting the inner panel 103 surface of the panel, and to construct a rim 137 extending from the body 136. More specifically, the tag housing 134—specifically, the rim 137—encases each edge 138 of the panel. In this implementation, the tag housing 134 extends through a portion of the first and the second set of perforations 106, 107 in the panel and extends over the set of perforations 105 in the panel.

For example, the tag 120 includes a tag housing 134 molded around the perimeter of the panel 135 and through the set of perforations 105 in the panel defining a body 136 supporting the inner face 103 of the panel and defining a rim 137 extending from the body 136, encasing an edge 138 of the panel, extending through the set of perforations 105 in the panel, and extending over the set of perforations 105 in the panel. In one variation, a first portion of the first set of perforations 105 is exposed relative to the rim 137 of the tag housing 134, and a first portion of the second set of perforations 106 exposed relative to the rim 137 of the tag housing 134.

In one implementation, the tag housing 134 can be constructed via injection molding (e.g., polymer) to compress and stabilize the panel 102 between the rim 137 and the body 136 of the tag housing 134. In this example, during the injection molding process, a portion of the polymer can extend through a portion of the first set of perforations 105 and the second set of perforations 106 to couple the panel 102 to the rim 137 and the body 136 of the tag housing 134. For example, the tag housing 134 can include a polymer injection molded into a tag mold, containing the panel 102, at a first temperature defining a first shank occupying a first perforation, forming a first head across a first countersunk zone of the first perforation, compressing the panel against the base at a second temperature less than the first temperature, defining a second shank occupying a second perforation, forming a second head across a second countersunk zone of the second perforation, and compressing the panel against the base at the second temperature. In one variation, the rim 137 of the tag housing 134 can extend through the first set of perforations 105 and the second set of perforations 106 at respective countersunk zones. For example, the rim 137 of the tag housing 134 can interconnect the first head and the second head opposite the panel.

Additionally, or alternatively, the rim 137 can include a first height and extend from the body of the tag housing at a first height.

In one implementation, the animal identification system includes: a barb 122 extending from the body 136 opposite the rim 137 including a shoulder 124 of a first diameter and configured to insert into a tag receiver 132 (i.e., a bore) of a backing plate 130; and a barb tip 123 arranged on a distal end of the shoulder 124 opposite the tag base 121, defining a maximum width greater than the diameter of the shoulder 124, and configured to retain the backing plate 130 on the shoulder 124.

In one variation, the tag housing includes a first color. More specifically, each tag housing 134 for each tag 120 in the set of tags 120 can be characteristic of a color to differentiate a first tag from a second tag located in the tray 110. In one variation, a color can correspond to a type of optical identifier—such as, a first QR code from a second QR code.

7. Backing Plate

Generally, the animal identification system 100 includes a set of backing plate 130. In one implementation, each backing plate 130 is configured to receive the barb 122 of a corresponding tag housing 134. For example, the backing plate 130 includes: a rectilinear base, such as a square base or square base with fileted or chamfered corners; and a cylindrical boss extending rearward from the base and defining an internal bore that defines a tag receiver 132 configured to receive and constrain a barb 122 of a tag housing.

Once the backing plate 130 and a corresponding tag 120 are assembled over a rodent's ear, the cylindrical boss can also protect the barb 122 of the tag 120 from access (e.g., chewing) by other rodents, which may result in inadvertent disassembly of the tag and backing plate.

8. Tray

As shown in FIGS. 4, 5, 11A, and 11B, the tray 110 defines one or more rows of tag receptacles 112, wherein each tag receptacle 112 is configured to: receive and retain a tag 120 and a corresponding backing plate 130; and locate the barb 122 of the tag 120 coaxial with the tag receiver 132 of the corresponding backing plate 130 with the barb 122 decoupled (i.e., withdrawn) from this tag receiver 132. For example, the tray 110 can include an injection molded polymer structure defining two rows of ten tag receptacles 112 on opposing sides of the tray 110.

In one implementation, a tag receptacle 112 defines a rectangular pocket 113 extending longitudinally into a side of the tray 110 by slightly greater than (e.g., 10% greater than) the width of the tag 120 and corresponding backing plate 130. The tag receptacle 112 can also define a barb slot 114: arranged over and centered laterally across the pocket 113; including a tapered lead-in to receive the barb 122 of a tag; and including a shoulder receiver behind the tapered lead-in configured to constrain the shoulder 124 of a tag. The tag receptacle 112 can also include a set of reliefs around the barb slot 114 to form a flexure or spring around the shoulder receiver, thereby enabling the shoulder receiver to: deform around a shoulder 124 of a tag as the tag is loaded into the barb slot 114; and then spring back into a nominal position to retain the shoulder 124 of the tag with the barb tip 123 of the tag located below the barb slot 114, extending into the pocket 113, and retaining the tag in the barb slot 114. The tag receptacle 112 can further include a boss guide 116 extending forward from a rear of the pocket 113 and configured to mate with and laterally constrain the boss of a backing plate within the pocket 113 such that the tag receiver 132—defined by a bore running through the boss—is approximately centered with the shoulder receiver of the barb slot 114 and thereby approximately coaxial with the barb 122 of a tag located in the tag receptacle 112. The tag receptacle 112 can also include a backing plate support tab 115 arranged on the bottom of the pocket 113 below (and coaxial with) the shoulder receiver of the barb slot 114 and configured to vertically support the backing plate 130 within the tag receptacle 112.

For example, the tag receptacle 112 can include a relief below the pocket 113 to form a set of undercuts on the left and right bottom sides of the pocket 113, which can vertically locate the lower forks 161 of an applicator 140, as described below, within the pocket 113. The left and right sides of the pocket 113 can laterally locate the lower forks 161 of the applicator 140 within the pocket 113. The backing plate support tab 115 can include a beam located below the boss guide 116, extending forward from the rear of the pocket 113, and terminating approximately coaxially with the barb slot 114. Therefore, in this example, when the barb 122 of a tag is loaded into the barb slot 114 of a tag receptacle 112 and when a backing plate is loaded into a pocket 113 of the tag receptacle 112, the backing plate support tab 115 can support the rear of the boss of the backing plate 130 and drive the backing plate 130 upward toward the tag such that the barb 122 of the tag inserts partially into the tag receiver 132 of the backing plate 130, thereby coaxially constraining the backing plate 130 on the tag and retaining the backing plate 130 within the pocket 113. Furthermore, the boss guide 116 can laterally constrain the boss of the backing plate 130 and the rear of the pocket 113 angularly locates the adjacent edge of the backing plate 130.

The barb slot 114—which includes a flexure or living spring that retains the barb 122 of the tag—can also deform around the barb 122 to enable a user to manually withdraw a tag out of the tag receptacle 112, such as both parallel and perpendicular to the axis of the barb 122.

Thus, in the foregoing example, the backing plate 130 is fully constrained and retained in the pocket 113 without contacting the left and right sides of the pocket 113, thereby yielding greater space for the lower tip of the applicator 140 to insert into a pocket 113 around the backing plate 130. More specifically, the vertical height of the pocket 113—that is, a vertical distance from the top of the backing plate support tab 115 to the base of the barb slot 114 at the top of the pocket 113—can be slightly less than (e.g., 90% of) the sum of the heights of the backing plate 130 and the barb tip 123 of the tag such that the barb tip 123 partially inserts into the tag receiver 132 of the backing plate 130 when the tag and the backing plate 130 occupy the tag receptacle 112. Therefore, when the backing plate 130 is loaded into the pocket 113 after the barb 122 of the tag is loaded into the barb slot 114, the backing plate support tab 115—which defines a cantilevered structure with narrow cross-section—can: deflect downwardly as the backing plate 130 rides down the barb tip 123; and then spring back to its nominal position to retain the backing plate 130 around the barb tip 123 once the barb tip 123 inserts into the tag receiver 132. (Furthermore, the boss guide 116 can center the backing plate 130 laterally within the pocket 113 as the backing plate 130 enters the pocket 113 and as the tag receiver 132 approaches the barb tip 123.)

Alternatively, the vertical height of the pocket 113 can be slightly less than (e.g., 98% of) the heights of the backing plate 130. Accordingly, the backing plate support tab 115 can: deflect downwardly to accommodate the backing plate 130 when inserted into the pocket 113; and can apply an upward force to the backing plate 130 to vertically constrain and retain the backing plate 130 against the top of the pocket 113. Concurrently, the boss guide 116 can: laterally constrain the backing plate 130 to maintain the tag receiver 132 of the backing plate 130 coaxial with the barb 122; maintain an offset between the sides of the backing plate 130 and the sides of the pocket 113; and thus provide more room for the lower tongue 160 of the applicator 140 to enter the pocket 113 and engage the backing plate 130.

9. Manufacturing: Overmolded Visual Identifier Tags with Contiguous Frame

In one variation, a set of tags 120 are molded over identifier elements that define visual identifiers and that are located within a contiguous frame.

Figure 6:
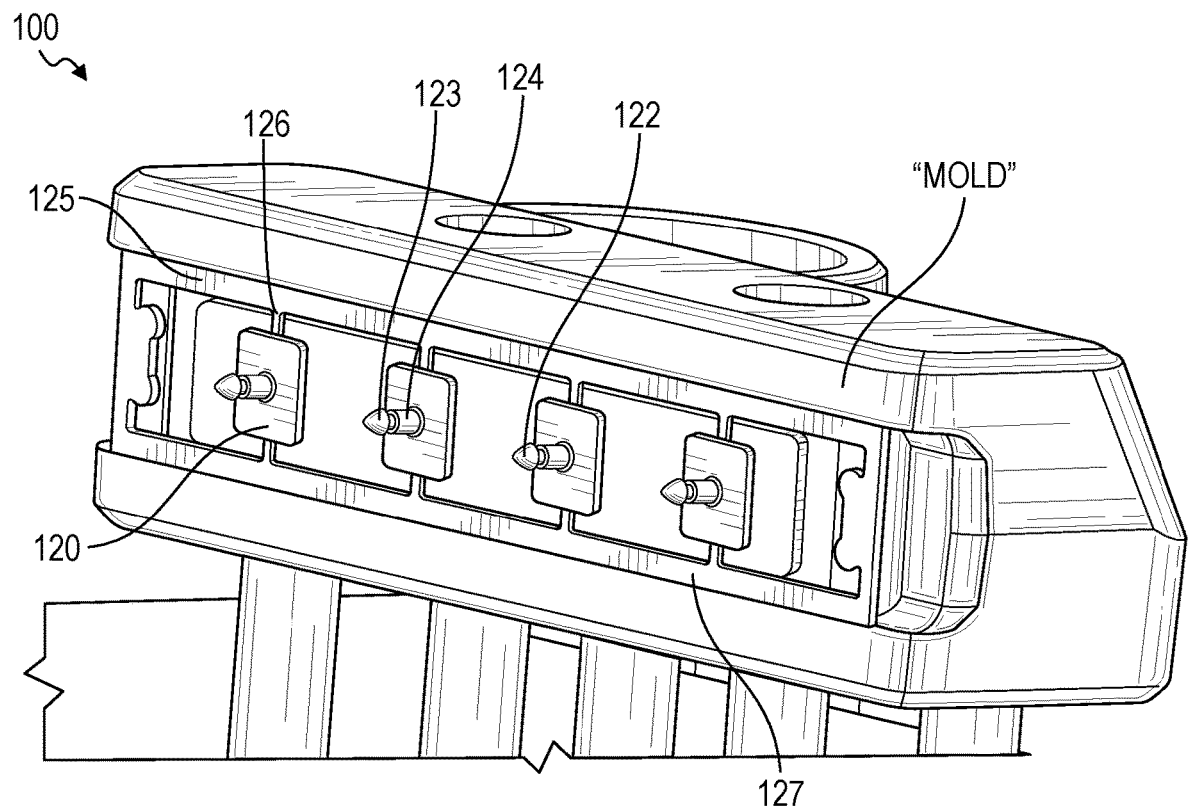
FIG. 6 is a schematic representation of one variation of the system.

In one implementation shown in FIG. 6, an aluminum sheet is punched, stamped, laser cut, or waterjet cut, etc. to form a pre-mold identifier element assembly that includes: two parallel and offset trees 125; and a row of rectilinear (e.g., square) identifier elements located between the trees 125, wherein each identifier element is supported off of and is connected to each tree 125 by a pair of tabs 126. In this implementation, the trees 125 therefore form a "frame" that locates the identifier elements via pairs of tabs 126. The pre-mold identifier element assembly is then loaded into an injection mold such that: the trees 125 seat in corresponding receptacles and are constrained within the mold; and the tabs 126 extend through apertures in the mold to locate identifier elements within tag base 121 cavities within the mold.

A polymer (e.g., nylon) is then injected into the mold to fill the tag base 121 cavities around the identifier elements and thus form an overmolded tag assembly 127 that includes: two parallel and offset trees 125; a row of tag bases 121—overmolded around identifier elements—located between the trees 125, wherein each tag base 121 is supported by and is connected to each tree 125 by a pair of tabs 126.

In a similar implementation, an aluminum reel is punched, stamped, laser cut, or waterjet cut, etc. to form a continuous reel including two parallel and offset trees 125; and rectilinear (e.g., square) identifier elements located between the trees 125, wherein each identifier element is supported by and is connected to each tree 125 by a pair of tabs 126. The reel is then loaded into an injection molding machine, a first end of the reel is extended into an injection mold such that a first set of identifier elements and a first length of the trees 125 seat within the injection mold. The injection molding machine then injects a polymer into the cavity of the injection mold around the identifier elements; the reel is rejected just behind the overmolded tag assembly 127; and the overmolded tag assembly 127 is ejected from the injection mold. A subsequent segment of the reel is the loaded into the injection mold and the process is repeated to form a subsequent instance of the overmolded tag assembly 127 by the injection mold machine.

9.1 Tray Loading

In this implementation, the tag bases 121 can be separated from the trees 125 and tabs 126 in the overmolded tag assembly 127. These loose tag bases 121 can then be loaded into tag receptacles 112 in the tray 110, such as manually or with a vacuum-tipped pick-and-place system.

Alternatively, the pre-mold identifier element assembly can locate identifier elements at a pitch offset equal to a pitch distance between tag receptacles 112 within a single row of tag receptacles 112 in the tray 110. Thus, in this implementation, a first tree 125 can be trimmed and removed from the pre-mold identifier element assembly. The tag bases 121—still connected and located by the second tree 125—can then be loaded into the tag receptacles 112 in the tray 110 (e.g., by inserting barbs 122 of the tag bases 121 into the tag receptacles 112). The second tree 125 can then be trimmed and removed from the tag bases 121 to free the individual tag bases 121 now loaded in the tray 110.

For example, prior to insertion of the overmolded tag assembly 127 into the tray 110, the tabs 126 between the tag bases 121 and the first tree 125 can be cut: manually with a pair of snips; manually or automatically with a linear shear; or automatically with a laser or waterjet cutter. Similarly, following insertion of the overmolded tag assembly 127 into the tray 110, the tabs 126 between the tag bases 121 and the first tree 125 can be cut manually with a pair of snips, with a linear shear, or with a laser or waterjet cutter. Alternatively, the second tree 125 can be folded to fatigue and then break these tabs 126 to free the tag bases 121.

9.2 Visual Identifier Application

In this implementation, prior to insertion into the mold, the pre-mold identifier element assembly can be loaded into an engraving machine, which can etch or scribe each identifier element with a unique visual identifier (e.g., a QR code, a barcode). Alternatively, after extraction from the mold, the overmolded tag assembly 127 can be loaded into the engraving machine, which can etch or scribe the exposed surfaces of the identifier elements in the overmolded tag assembly 127 with unique visual identifiers. Therefore, in these implementations, because the identifier elements are rigidly located in the pre-mold identifier element assembly, these identifier elements can be accurately and repeatably located within the engraving machine, thereby enabling the engraving machine to apply unique identifiers squarely across a maximum area of each identifier element.

Yet alternatively, after the tag bases 121 are loaded into the tray 110, the tray no can be loaded into the engraving machine, which can etch or scribe the exposed surfaces of the identifier elements in these tag bases 121 with unique visual identifiers. Therefore, in this implementation, unique visual identifiers can be applied to the identifier elements after manufacture and loaded into the tray 110, such as by a scientist in a laboratory. Additionally, or alternatively, in this implementation, unique visual identifiers can be applied only to exposed surfaces of the identifier elements after overmolding, thereby avoiding damage or obfuscation of these visual identifiers during overmolding, trimming, and loading into the tray 110.

Following application of the visual identifiers, the visual identifiers on the tag bases 121 can be read with optical sensors, such as with color cameras arranged over a rodent cage or with a camera integrated into a mobile computing device (e.g., a smartphone).

10. Manufacturing: Overmolded Wireless Identifier Tags with Contiguous Frame

In another implementation, discrete groups of antennas, inductive charging coils, and integrated circuit pads are fabricated on a flexible or rigid PCB. A set of integrated circuits loaded (or "flashed") with unique identifiers are soldered onto integrated circuit pads on the PCB. The PCB is then punched, stamped, laser cut, or waterjet cut, etc. to form a pre-mold identifier element assembly that includes: two parallel and offset trees 125; and a row of rectilinear (e.g., square) identifier elements located between the trees 125, wherein each identifier element is supported by and is connected to each tree 125 by a pair of tabs 126 and includes an integrated circuit, an antenna, and an inductive charging coil. The trees 125 therefore form a "frame" that locates the identifier elements via pairs of tabs 126.

This pre-mold identifier element assembly is then loaded into an injection mold and overmolded within a polymer to form an overmolded tag assembly 127, as described above. The overmolded tag assembly 127 can then be trimmed and/or individual tag bases 121 from this overmolded tag assembly 127 can be loaded into a tray 110, as described above. Later, the identifiers loaded onto these tag bases 121 can be interrogated with wireless readers, such as with a handheld RFID reader or an RFID reader integrated into (or arranged below) the base of a rodent cage 11. Manufacturing: Double-Row Overmolded Visual Identifier Tags In another implementation, a pre-mold identifier element assembly is fabricated or assembled, such as described above, to include: three parallel and offset trees 125; a first row of identifier elements located between a first and second (i.e., middle) tree 125, wherein each of these identifier elements is supported by and is connected to each of the first and second trees 125 by a pair of tabs 126; and a second row of identifier elements located between the second and third trees 125, wherein each of these identifier elements is supported by and is connected to each of the second and third trees 125 by a pair of tabs 126.

In this implementation, the lateral pitch between identifier elements in the rows of identifier elements can approximate the pitch distance between tag receptacles 112 in one row of tag receptacles 112 in the tray 110; and the longitudinal pitch between rows of identifier elements in the pre-mold identifier element assembly can approximate the longitudinal pitch distance between adjacent rows of tag receptacles 112 in the tray 110. Therefore, identifier elements in the single pre-mold identifier element assembly can be overmolded with a polymer to form two parallel rows of tag bases 121 supported between the three trees 125.

This overmolded tag assembly 127 can then be loaded onto the tray 110 to seat tag bases 121 into their tag receptacles 112 in the tray 110, and the trees 125 can then be trimmed to complete loading of tag bases 121 into two rows of tag receptacles 112 in the tray 110.

12. Manufacturing: RFID Tag Tape

In another implementation, a backing strip (or "tape")—populated with RFID tags—is loaded directly into an injection mold with these RFID tags located (e.g., centered) within tag base 121 cavities in the injection mold. A polymer is then injected into the mold to overmold a set of tags 120 around these RFID tags.

In this implementation, a row of tags—still connected via the backing strip—can then be loaded into the tray 110, as described above, and the backing strip is then torn off of the tags to free these tags in the tray 110.

13. Manufacturing: Backing Plate

In the foregoing implementations, a set of backing plates 130 can be similarly injection molded in a group, broken, or cut from a tree 125, and then individually loaded into tag receptacles 112 in the tray 110 such that the tag receiver 132 of each backing plate is coaxial with the barb 122 of its corresponding tag base 121.

In another implementation, a set of backing plates 130 are injection molded around identifier elements that are connected by a tree 125 and a set of gates. The tree 125 and gates align these backing plates in a single row and at a pitch offset equal to a pitch distance between tag receptacles 112 within a single row of tag receptacles 112 in the tray 110. Accordingly, in this implementation, after the tree 125 and set of backing plates 130 are removed from the injection mold, the tree 125 and set of backing plates 130 can be inserted en masse into the tag receptacles 112 on one side of the tray 110. The gates between these backing plates and the tree 125 can then be cut, such as with manual snips, a linear shear, a die, or a laser or waterjet cutter.

14. Applicator

Generally, the applicator 140 includes: an upper tongue defining a pair of upper forks configured to receive the tag; including a lower tongue defining a pair of lower forks configured to receive the backing plate; and configured to drive the barb through an ear of an animal and into the backing plate to identify the animal according to the digital optical identifier.

Figure 2:
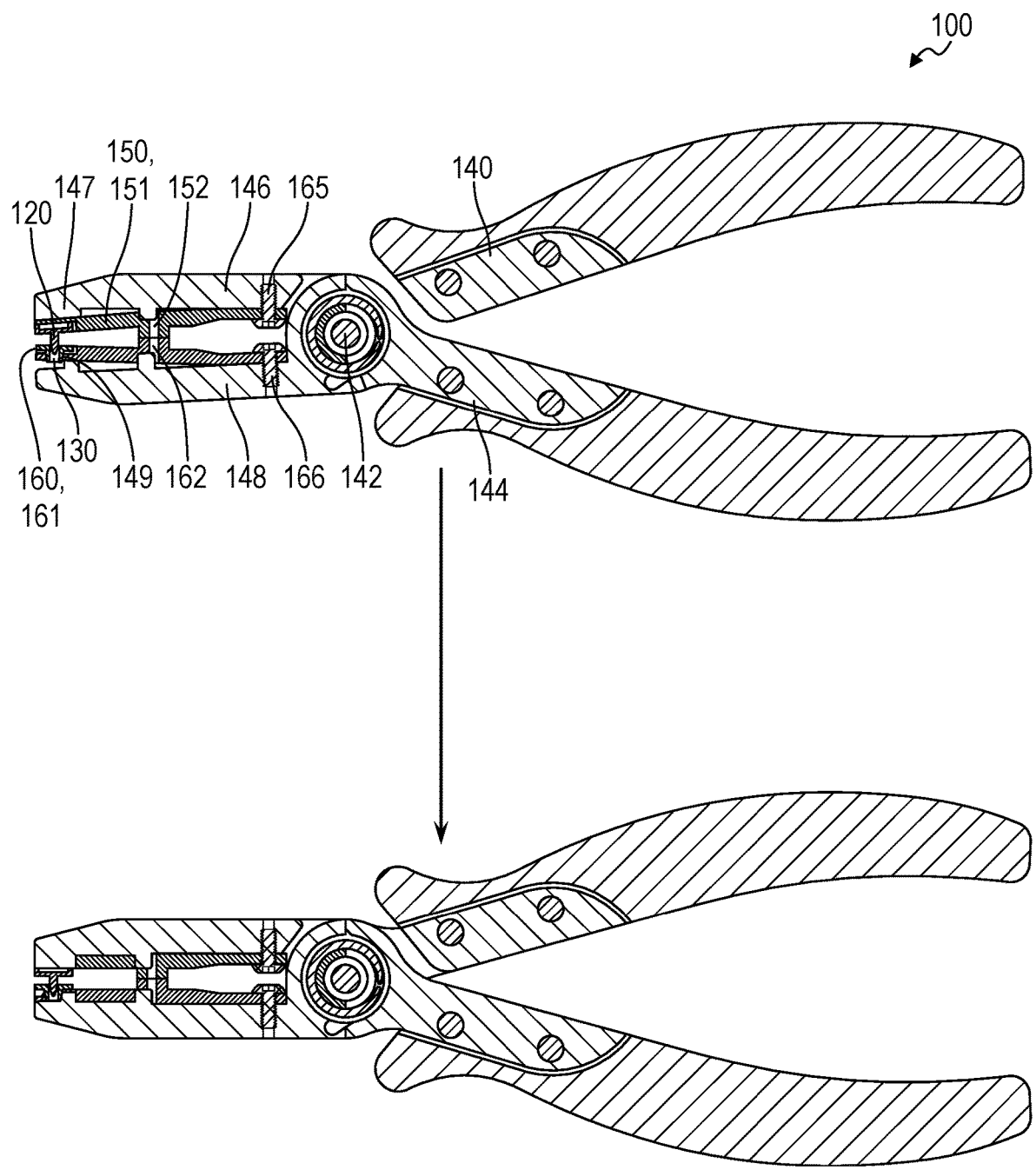
FIG. 2 is a flowchart representation of one variation of the system.
Figure 3:
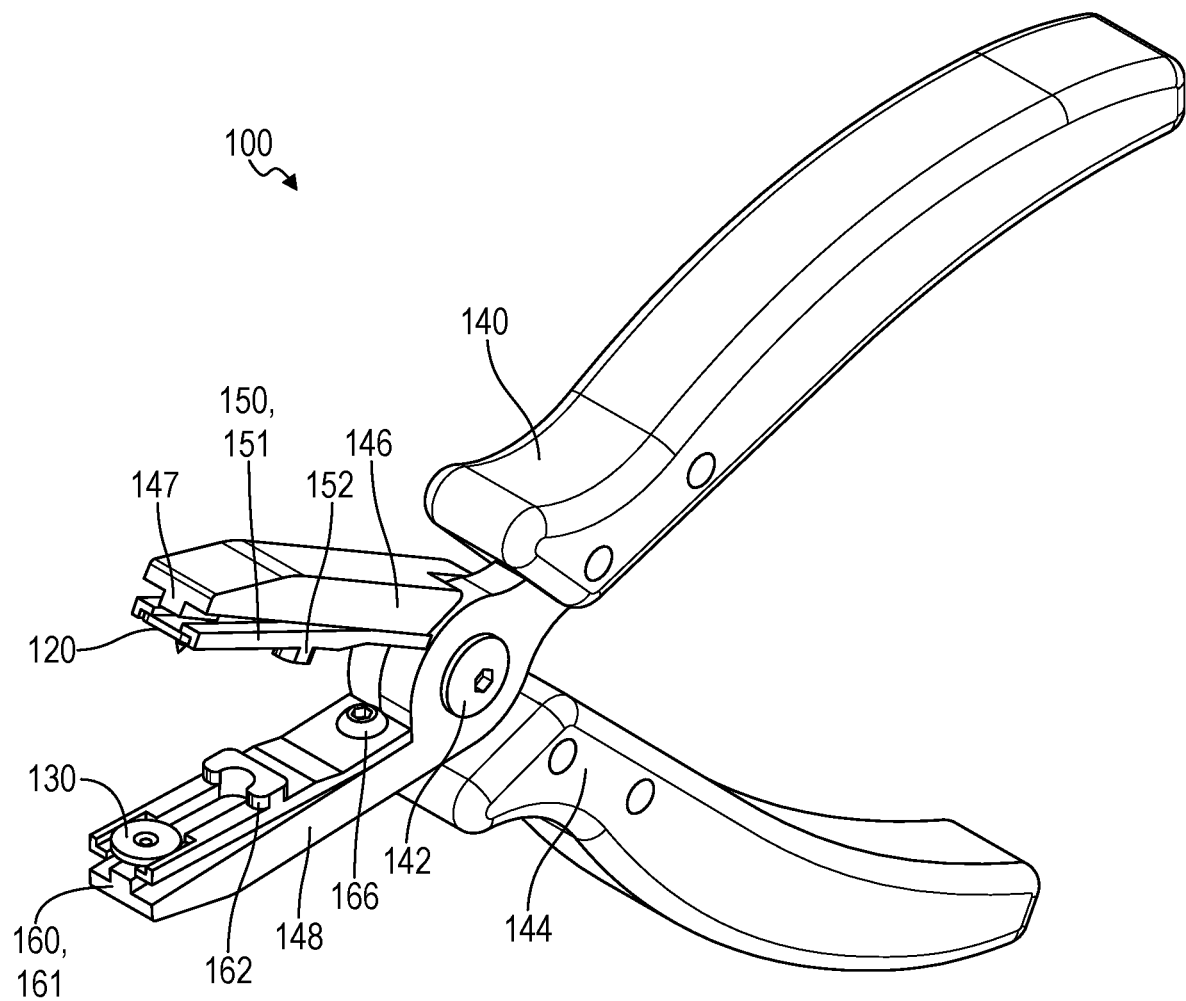
FIG. 3 is a schematic representation of one variation of the system.
Figure 4:
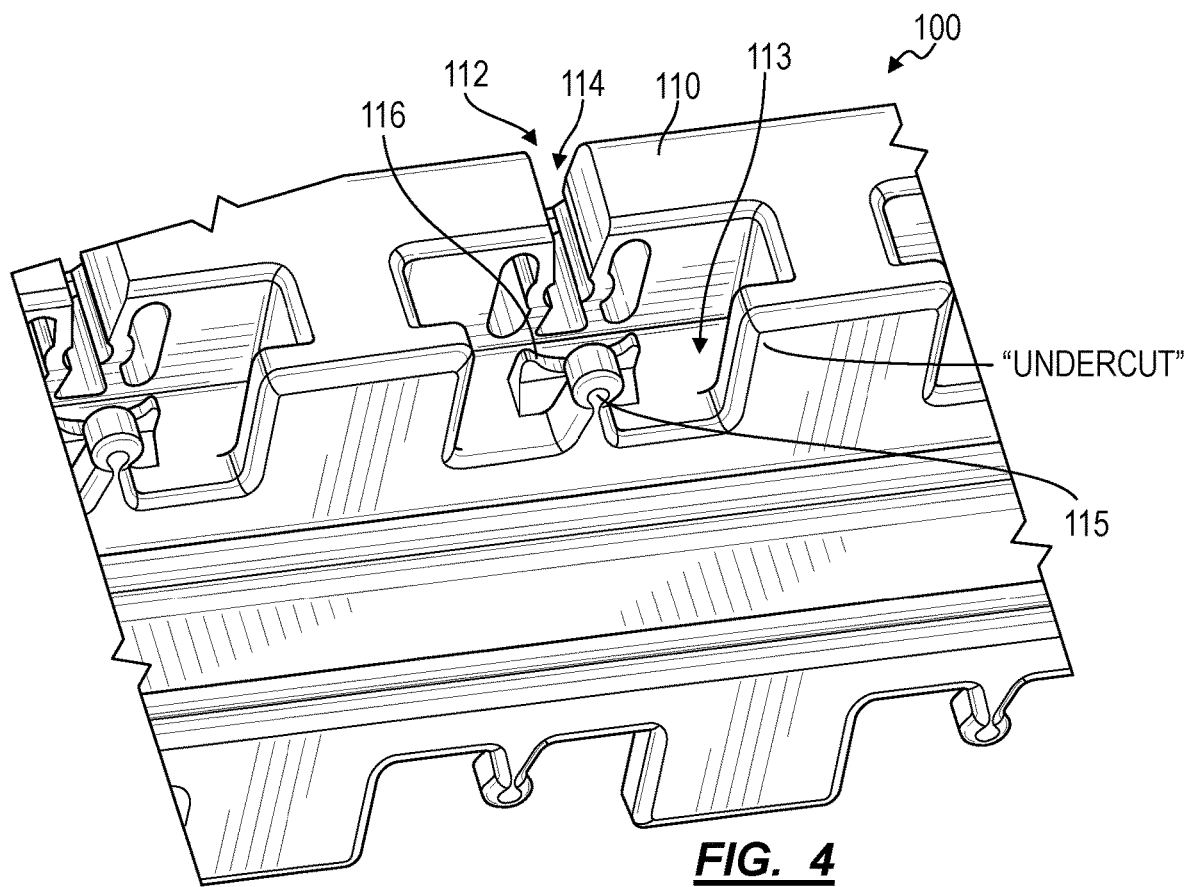
FIG. 4 is a schematic representation of one variation of the system.
Figure 5:
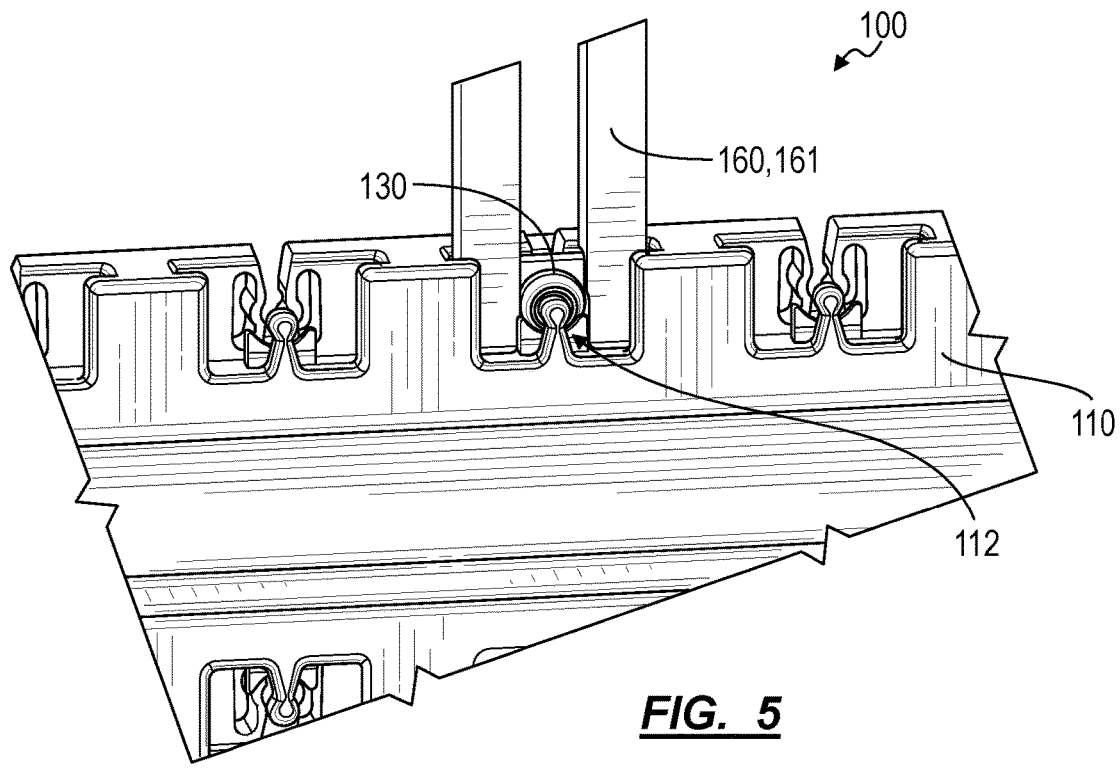
FIG. 5 is a schematic representation of one variation of the system.

In one implementation shown in FIGS. 1-3, the applicator 140 includes a set of pliers 144 in a grip-to-close configuration and including: an upper jaw 146 fore of a pivot 142 and defining a tag ejection boss 147 proximal a tip of the upper jaw 146; and a lower jaw 148 fore of a pivot 142 and defining a backing plate ejection boss 149 proximal a tip of the lower jaw 148. The applicator 140 also includes an upper tongue 150 including: a proximal end mounted to the upper jaw 146 proximal the pivot 142; a distal end defining a pair of upper forks 151 extending on each lateral side of the tag ejection boss 147 and configured to splay outwardly to receive a tag, defining a lower seat configured to engage opposing lateral sides of the tag, and biased downwardly off of the tip of the upper jaw 146; and a set of upper stops 152 extending downwardly from the pair of upper forks 151 between the proximal end and the distal end of the upper tongue 150. The applicator 140 further includes a lower tongue 160 including: a proximal end mounted to the lower jaw 148 proximal the pivot 142; a distal end defining a pair of lower forks 161 extending on each lateral side of the backing plate ejection boss 149 and configured to splay outwardly to receive a backing plate, configured to insert into a pocket 113 of a tag receptacle 112 in the tray 110, defining a lower seat configured to engage opposing lateral sides of the backing plate 130, and biased upwardly off of the tip of the lower jaw 148; and a set of lower stops 162. The lower stops 162: extend upwardly from the pair of lower forks 161 between the proximal end and the distal end of the lower tongue 160; and are configured to engage the set of lower stops 162 during actuation of the set of pliers 144 to a) drive the distal end of the upper tongue 150 toward the tag ejection boss 147 to eject the tag from the pair of upper forks 151 and b) drive the distal end of the lower tongue 160 toward the backing plate ejection boss 149 to eject the backing plate 130 from the pair of lower forks 161. As shown in FIG. 9, during actuation of the set of pliers 144, the tag ejection boss 147 and the backing plate ejection boss 149 cooperate to: retain the tag following ejection from the pair of upper forks 151; retain the backing plate 130 following ejection from the pair of lower forks 161; and drive a barb 122 of the tag into a tag receiver 132 of the backing plate 130 to seat the barb 122 within the tag receiver 132.

Figure 10:
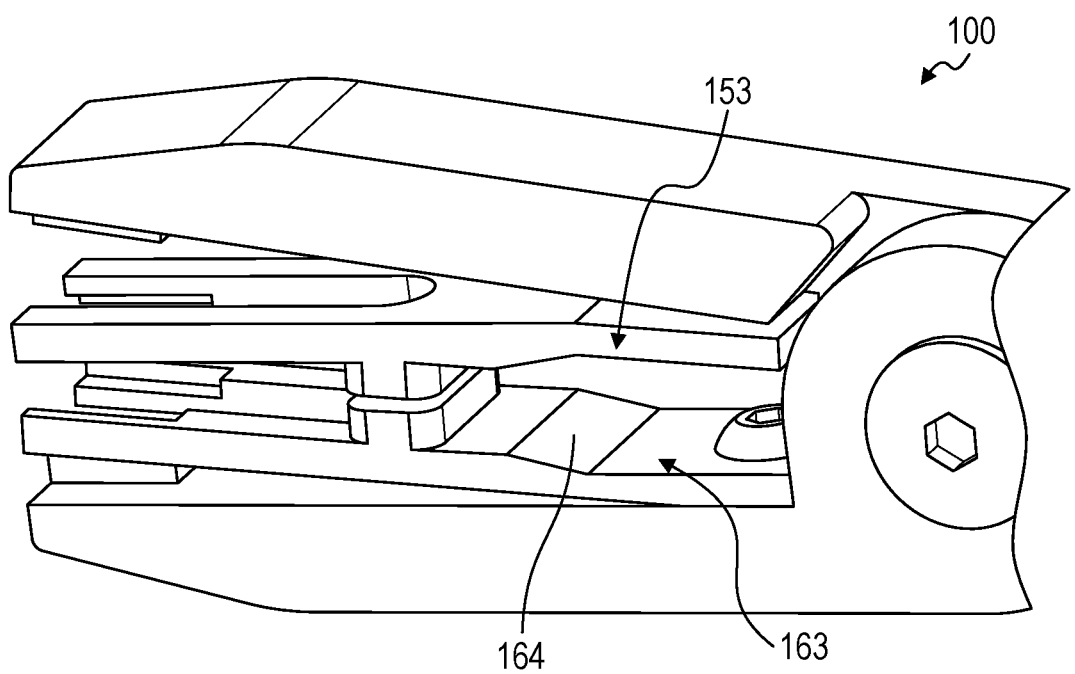
FIG. 10 is a schematic representation of one variation of the system.
Figure 11A:
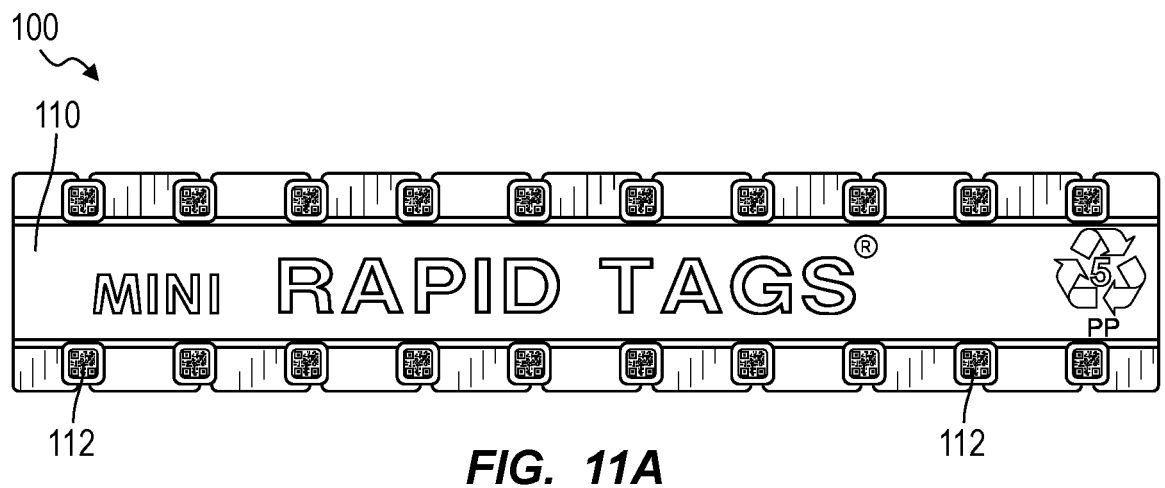
FIGS. 11A, and 11B are schematic representations of one variation of the system.
Figure 11B:
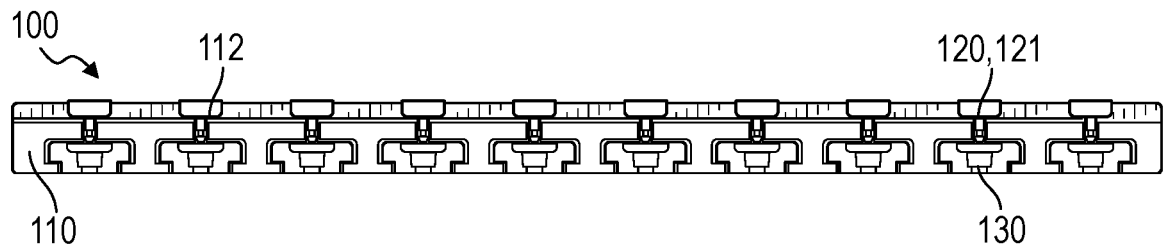
Figure 12:
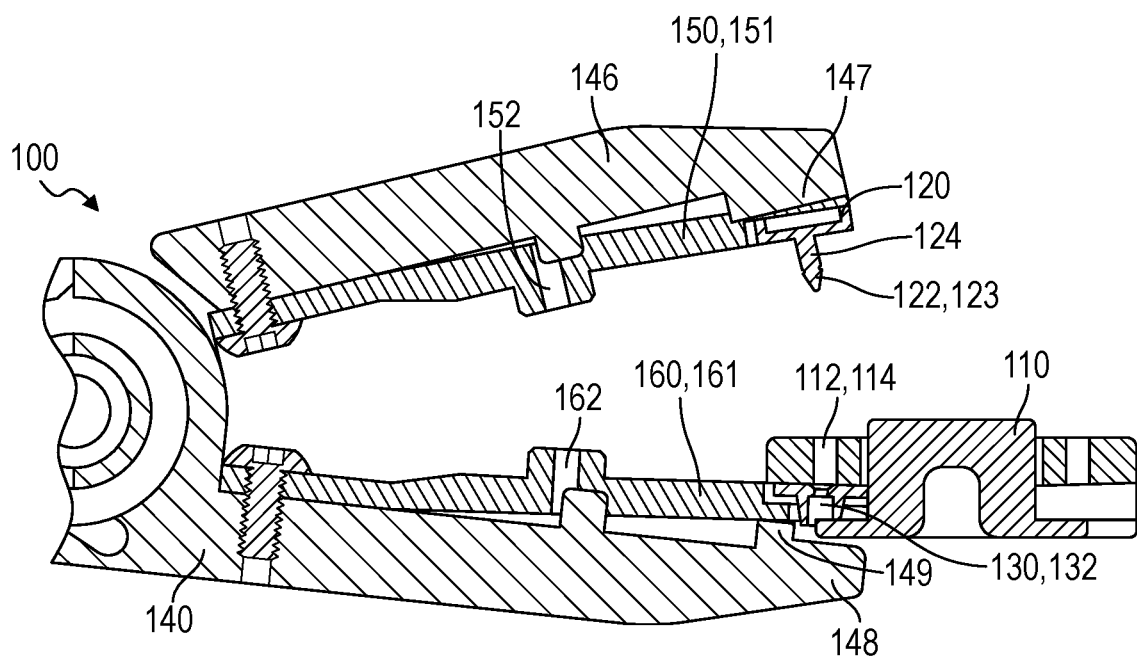
FIG. 12 is a schematic representation of one variation of the system.

As shown in FIG. 10, in one implementation, the applicator 140 further includes: an upper tongue surface 153 extending between the pivot 142 and the upper stops 152; and a lower tongue surface 163 extending between the pivot 142 and the lower stops 162. In this implementation, the upper tongue surface 153 and the lower tongue surface 163 can be manufactured (e.g., filed, milled) via a ball nose end mill, a bull nose end mill, etc. In one variation, a first portion 164 of the lower tongue surface 163 is formed via a ball nose end mill, As shown in FIGS. 1, 2, and 3, in one implementation, the applicator 140 includes an upper tongue fastener 165, and a lower tongue fastener 166, such as a rivet, a screw, a bolt, etc., extending through the upper tongue 150, and the lower tongue 160, respectively. In this implementation, the upper tongue 150 (upper tongue surface 153) extends distally from the upper tongue fastener 165 in the direction of the upper tongue stops 152, and the lower tongue 160 (lower tongue surface 163) extends distally from the lower tongue fastener 166 in the direction of the lower tongue stops 162. In this implementation, the upper tongue fastener 165 extends through the upper jaw 146, and the lower tongue fastener 166 extends through the lower jaw 148 of the set of pliers 144.

14.1 Upper Tongue and Upper Jaw

In one implementation, the upper tongue 150 includes: a rear body defining a proximal end pinned (e.g., fastened with a threaded fastener) to the underside of the upper jaw 146 near the pivot 142 of the set of pliers 144; and a tongue section defining a pair of laterally offset and split forks extending forward from the rear body.

In this implementation, the upper tongue 150 is machined, stamped, or otherwise processed to form an arch: such that the proximal end of the upper tongue 150 fastens to the upper jaw 146 near the pivot 142 of the set of pliers 144; and such that the distal end of the upper tongues 150 droops downwardly and is offset below the tip of the upper jaw 146 of the set of pliers 144. (Conversely, the underside of the upper jaw 146 near the pivot 142 of the set of pliers 144 can be machined stamped, forged, or otherwise fabricated to form an angled seat that locates the upper tongue 150 at an angle on the upper jaw 146: such that the proximal end of the upper tongue 150 fastens squarely to the upper jaw 146 near the pivot 142 of the set of pliers 144; and such that the distal end of the upper tongues 150 droops downwardly and is offset below the tip of the upper jaw 146 of the set of pliers 144.)

The upper tongue 150 also includes a set of upper stops 152 extending downwardly from the pair of forks (or from a center section of the upper tongue 150 between the rear body and the tongue section). The upper stops 152 are configured to: clamp against the lower stops 162 of the lower tongue 160; bend the distal end of the upper tongue 150 toward the tip of the upper jaw 146 of the set of pliers 144; and to a set a minimum distance between the upper and lower tongues 150, 160—greater than a maximum ear thickness of a target rodent (e.g., lab mice)—when the set of pliers 144 are gripped and closed, thereby preventing damage to a rodent's ear when tagged with the applicator 140.

The forks define seats configured to receive the sides of a tag base 121 and spanning a lateral distance slightly (e.g., 2%) less than a nominal width of the tag base 121 such that: the base of the tag interferes with the seats in the forks and causes the forks to splay laterally outwardly to receive and clamp against the tag base 121. The forks also: define tapered lead-ins at the fronts of the seats to ease insertion of the tag base 121 into the seat; and rear stops configured to prevent longitudinal translation of the tag base 121 rearward toward the pivot 142 of the set of pliers 144. Furthermore, the forks define an aperture (or a longitudinal "slot") configured to receive a tag ejection boss 147—extending downwardly from the underside of the distal end of the upper jaw 146—as the set of pliers 144 are gripped and closed. Accordingly, the tag ejection boss 147 can drive a tag base 121—of a tag occupying the seats in the forks—downward, out of the upper tongue 150, and seat a barb 122 of the tag in a tag receiver 132 of a corresponding backing plate located below by the lower jaw 148 of the set of pliers 144.

In one variation, the tag ejection boss 147 includes an elongated structure or a pair of longitudinally-offset studs configured to contact the fore and aft edges of a tag base 121—occupying the seats of the forks—and to apply a downward force to these edges of the tag base 121 rather than the center of the base as the set of pliers 144 are gripped and closed in order to prevent damage to a visual or digital identifier contained near the center of the tag base 121.

14.2 Lower Tongue

The lower tongue 160 can define a similar structure that is similarly mounted to the lower jaw 148 of the pliers 144.

In particular, the lower tongue 160 can include: a rear body defining a proximal end pinned (e.g., fastened with a threaded fastener) to the underside of the lower jaw 148 near the pivot 142 of the set of pliers 144; and a tongue section defining a pair of laterally offset and split forks extending forward from the rear body. In this implementation, the lower tongue 160 is machined, stamped, or otherwise processed to form an arch: such that the proximal end of the lower tongue 160 fastens to the lower jaw 148 near the pivot 142 of the set of pliers 144; and such that the distal end of the lower tongues 150, 160 lift upwardly and is offset above the tip of the lower jaw 148 of the set of pliers 144.

The lower tongue 160 also includes a set of lower stops 162 extending upwardly from the pair of forks (of from a center section of the lower tongue 160 between the rear body and the tongue section). The lower stops 162 are configured to: clamp against the upper stops 152 of the upper tongue 150; bend the distal end of the lower tongue 160 toward the tip of the lower jaw 148 of the set of pliers 144; and to a set a minimum distance between the upper and lower tongues 150, 160—greater than a maximum ear thickness of a target rodent (e.g., lab mice)—when the set of pliers 144 are gripped and closed, thereby preventing damage to a rodent's ear when tagged with the applicator 140.

However, when the set of pliers 144 are open, the distal end of the forks can be offset above the tip of the lower jaw 148 by a distance (slightly) greater than the seats and undercut sections of a pocket 113 in the tray 110 such that: the fork can insert into the pocket 113 to receive a backing plate; the tip of the lower jaw 148 of the pliers 144 locates under the seats and undercut sections of the pocket 113; and the seats and undercut sections of the pocket 113 prevent the forks from deflecting toward the tip of the lower jaw 148, thereby preventing the backing plate ejection boss 149 on the lower jaw 148 from ejecting the backing plate 130 from the forks if the pliers 144 are closed as the pliers 144 are loaded with a tag and backing plate 130.

14.2 Swappable Tongues

Figure 7:
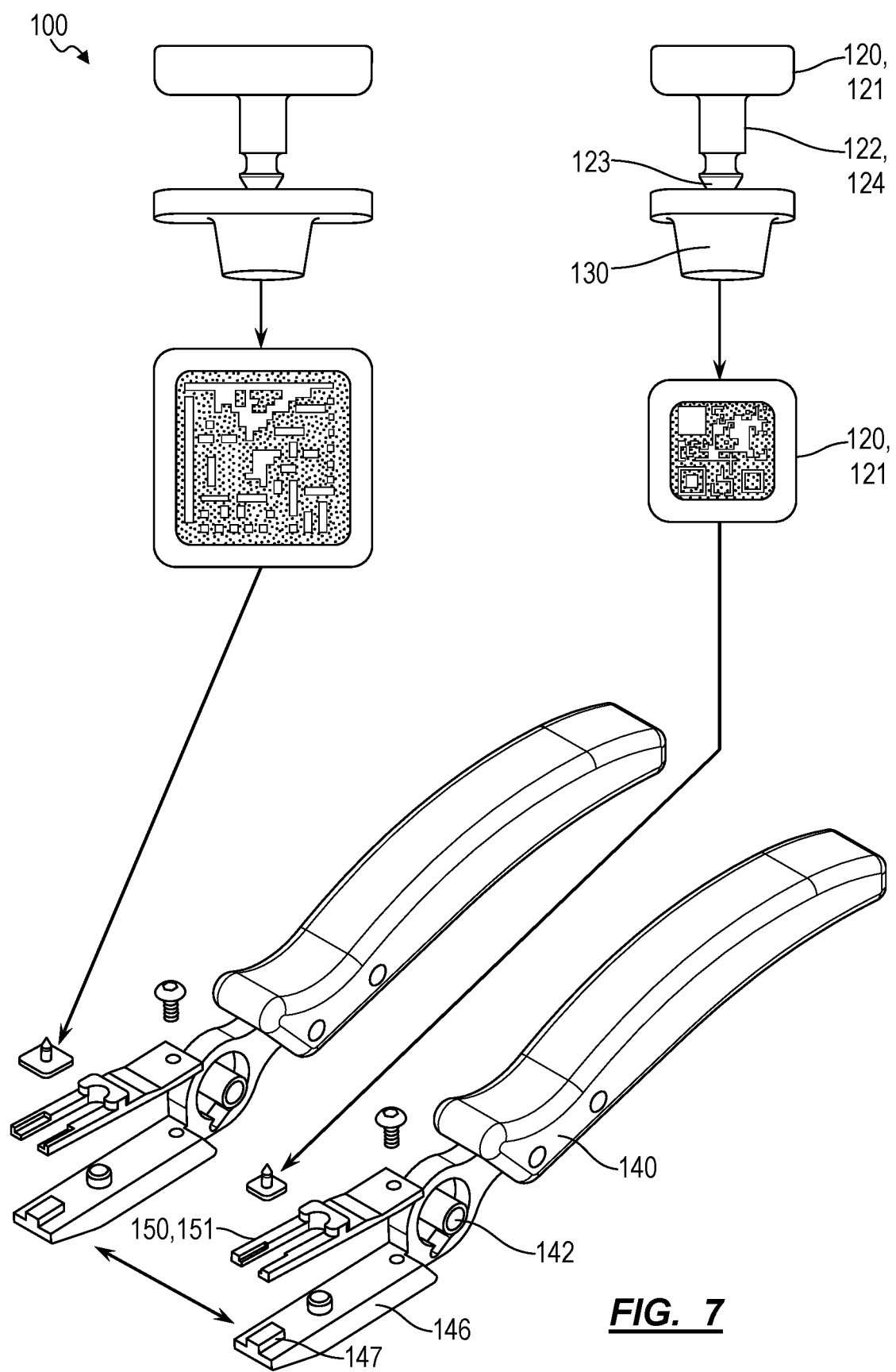
FIG. 7 is a flowchart representation of one variation of the system.

As shown in FIG. 7, the tongues of the applicator 140 can be configured: to fasten to the rears of the upper and lower jaws 148 of the applicator 140 near the pivot 142 with one threaded fastener per jaw; and to be replaced by a similar set of jaws configured to engage tags of a different size. For example, a first set of tongues can be installed on the applicator 140 to configure the applicator 140 to interface with 3.5-millimeter-wide tags for application onto mice between three and five days of age. Later, a second set of tongues can be installed on the applicator 140 to configure the applicator 140 to interface with 5-millimeter-wide tags for application onto mice between greater than twelve days of age.

15. Method of Manufacturing: Tag System

Generally, as shown in FIGS. 13A, and 13B, in one implementation, a method S100 for manufacturing the tag 120 includes: forming the set of perforations 105 along edges of the panel 102; constructing the tag housing 134 around the panel 102 engraving the optical digital identifier 133 on the panel 102; and loading the tag 120 into the tray 110.

For example, the method S100 for manufacturing the tag 120 includes: forming a set of perforations along a perimeter of a rectilinear panel and extending through the panel between an inner face and an outer face of the panel in Block S110, overmolding a tag housing around the perimeter of the rectilinear panel and through the set of perforations in the rectilinear panel in Block S120; engraving an optical digital identifier on the outer face of the rectilinear panel at a distance away from the rim in Block S130; and loading the tag into a tag receptacle of a tray in Block S140.

As shown in FIG. 13B, forming a set of perforations along a perimeter of a rectilinear panel and extending through the panel between an inner face and an outer face of the panel in Block S110 includes, forming a first set of perforations positioned at each corner of the panel in Block Sill, forming a second set of perforations proximal each perforation in the first set of perforations between corners of the panel in Block S112, countersinking each perforation in the first set of perforations on the outer face of the panel in Block S113, and countersinking each perforation in the second set of perforations on the inner face of the panel in Block S114. As shown in FIG. 13B, in one implementation, following countersinking each perforation in the second set of perforations on the inner face of the panel, method S100 proceeds to overmolding the tag housing around the perimeter of the panel and through the set of perforations in the panel in Block S120.

In one implementation, the method for manufacturing the tag 120 includes loading the tag into a tag receptacle of a tray in Block S140. More specifically, method S100 includes loading the tag into a tag receptacle of a tray via an applicator by locating the barb coaxial with a tag receiver of a corresponding backing plate.

In this implementation, the method for manufacturing the tag includes overmolding the tag housing defining a body supporting the inner face of the rectilinear panel; defining a rim traversing an edge of the rectilinear panel and extending through the set of perforations in the rectilinear panel; and defining a barb extending from the body of the tag housing.

In this implementation, the method S100 for manufacturing the tag includes overmolding the tag housing defining the rim extending from the body of the tag housing; encasing an edge of the panel; and extending over the set of perforations in the panel. Therefore, the tag housing stabilizes the panel between the rim and the body, thereby reducing dislocation of the panel from the tag housing responsive to an animal chewing the tag (e.g., the rim, the body) while the tag is engaged with an appendage of the animal.

In one variation, a method for manufacturing the tag includes: forming a first set of perforations positioned at each corner of the rectilinear panel, each perforation in the first set of perforations countersunk on the outer face; and forming (via stamping punching, drilling, etching) a second set of perforations arranged proximal each perforation in the first set of perforations between corners of the rectilinear panel, each perforation in the second set of perforations countersunk on the inner face. Therefore, a portion of the first set of perforations and the second set of perforations can fill with a polymer (e.g., a plastic) during injection molding to secure the panel in the tag housing and reduce separation of the panel from the tag housing during batch experiments.

In one implementation, the method for manufacturing the tag 120 includes engraving an optical digital identifier on the outer face of the rectilinear panel at a distance away from the rim. More specifically, the method includes etching a machine-readable image, such as a quick response code or other visual identifier, across the outer face of the panel. Therefore, the optical digital identifier can function to differentiate between animals in the batch experiment and classify each animal based on the animal-specific optical digital identifier.

As a person skilled in the art will recognize from the previous detailed description and from the figures and claims, modifications and changes can be made to the embodiments of the invention without departing from the scope of this invention as defined in the following claims.

We claim:
1. A system comprising:
a first tag comprising:
a panel defining:
a rectangular geometry;
an inner face;
an outer face opposite the inner face and comprising a digital optical identifier; and
a first set of perforations:
interposed between the digital optical identifier and a perimeter of the panel;
positioned at corners of the rectangular panel; and
countersunk on the outer face; and
a tag housing:
molded around the perimeter of the panel and through the first set of perforations in the panel;
defining a body supporting the inner face of the panel;
defining a rim:
extending from the body;
encasing an edge of the panel;
extending through the first set of perforations in the panel; and
extending over the first set of perforations in the panel; and
a barb extending from the body opposite the rim;
a backing plate configured to receive the barb of the tag housing; and
an applicator:
comprising an upper tongue defining a pair of upper forks configured to receive the first tag;
comprising a lower tongue defining a pair of lower forks configured to receive the backing plate; and
configured to drive the barb through an ear of an animal and into the backing plate to identify the animal according to the digital optical identifier;
wherein portions of the first set of perforations are exposed adjacent the rim of the tag housing.

2. The system of claim 1, wherein the tag housing:
comprises a polymer injection molded into a tag mold, containing the panel, at a first temperature;
defines a first shank occupying a first perforation in the first set of perforations;
forms a first head across a first countersunk zone of the first perforation;
compresses the panel against the body of the tag housing in response to the polymer cooling from the first temperature to a second temperature less than the first temperature;
defines a second shank occupying a second perforation in the first set of perforations;
forms a second head across a second countersunk zone of the second perforation; and
compresses the panel against the body of the tag housing in response to the polymer cooling from the first temperature to the second temperature.

3. The system of claim 2:
wherein the rim of the tag housing interconnects the first head and the second head opposite the panel; and
wherein the rim of the tag housing extends from the body at a first height.

4. The system of claim 1, wherein the panel further comprises a second set of perforations:
arranged proximal the first set of perforations;
arranged between corners of the rectangular panel;
countersunk on the inner face of the panel; and
exposed adjacent the rim of the tag housing.

5. The system of claim 1, wherein the applicator comprises:
an upper jaw defining a tag ejection boss positioned at a tip of the upper jaw;
a lower jaw defining a backing plate ejection boss positioned at a tip of the lower jaw;
a set of lower stops extending upwardly from the pair of lower forks; and
a set of upper stops extending downwardly from the pair of upper forks and configured to engage the set of lower stops during actuation of the applicator to:
drive the upper tongue toward the tag ejection boss to eject the first tag from the pair of upper forks; and
drive the lower tongue toward the backing plate ejection boss to eject the backing plate from the pair of lower forks.

6. The system of claim 1, wherein the backing plate further comprises:
a rectilinear base; and
a cylindrical boss extending rearward from the rectilinear base and defining a tag receiver configured to receive and constrain the barb of the tag housing.

7. The system of claim 6, further comprising a tray defining a set of tag receptacles, each tag receptacle in the set of tag receptacles configured to:
receive a tag and a corresponding backing plate; and
locate the barb of the tag housing coaxial with the tag receiver of the corresponding backing plate.

8. The system of claim 7,
wherein the applicator is configured to insert into a tag receptacle in the tray to:
retrieve a tag and a backing plate from the tag receptacle;
maintain the backing plate coaxial with the barb of the tag housing;
pierce an appendage of the animal to couple the backing plate onto the barb of the tag housing in a continuous actuation motion.

9. The system of claim 1, wherein the optical digital identifier comprises a quick response code etched across the outer face of the panel.

10. A tag comprising:
a panel defining:
an inner face;
an outer face opposite the inner face and comprising a digital optical identifier; and
a set of perforations inset from an edge of the panel and comprising:
a first subset of perforations arranged proximal corners of the panel and countersunk on the outer face of the panel; and
a second subset of perforations arranged proximal the first subset of perforations between corners of the panel and countersunk on the inner face of the panel; and a tag housing:
molded around a perimeter of the panel and through the set of perforations in the panel;
defining a body supporting the inner face of the panel;
defining a rim:
extending from the body;
encasing an edge of the panel;
extending through the set of perforations in the panel; and
extending over the set of perforations in the panel; and
a barb extending from the body opposite the rim.

11. The tag of claim 10, wherein the tag housing:
comprises a polymer injection molded into a tag mold, containing the panel, at a first temperature;
defines a first shank occupying a first perforation in the first subset of perforations;
forms a first head across a first countersunk zone of the first perforation;
compresses the panel against the body of the tag housing in response to the polymer cooling from the first temperature to a second temperature less than the first temperature;
defines a second shank occupying a second perforation in the second subset of perforations;
forms a second head across a second countersunk zone of the second perforation; and
compresses the panel against the body of the tag housing in response to the polymer cooling from the first temperature to the second temperature.

12. The tag of claim 11:
wherein the rim of the tag housing interconnects the first head and the second head opposite the panel; and
wherein the rim of the tag housing extends from the body at a first height.

13. The system of claim 10:
wherein the panel comprises a textured pattern across the outer face of the panel; and
wherein the optical digital identifier comprises a machine-readable image etched across the outer face of the panel.

* * * * *